United States Patent [19]

Schmitt

[11] 4,385,836

[45] May 31, 1983

[54] PHOTOELECTRIC DIGITAL POSITION MEASURING SYSTEM

[75] Inventor: Walter Schmitt, Traunreut, Fed. Rep. of Germany

[73] Assignee: Dr. Johannes Heidenhain GmbH, Traunreut, Fed. Rep. of Germany

[21] Appl. No.: 236,164

[22] Filed: Feb. 20, 1981

[30] Foreign Application Priority Data

Feb. 27, 1980 [DE] Fed. Rep. of Germany ....... 3007311

[51] Int. Cl.³ ............................................. G01B 11/04
[52] U.S. Cl. .................................. 356/374; 33/125 C; 250/214 C
[58] Field of Search ....................... 356/373, 374, 375; 33/125 A, 125 C; 250/237 G, 214 C

[56] References Cited

U.S. PATENT DOCUMENTS 3,713,139  1/1973  Sanford et al. ................. 250/237 G
4,263,506  4/1981  Epstein ........................... 250/237 G

FOREIGN PATENT DOCUMENTS 55-12417  1/1980  Japan ............................... 250/214 C

OTHER PUBLICATIONS messen+prüfen/automatik, Jun. 1974, pp. 371-374, "Neuere Entwicklungen bei fotoelektrischen Längenmessgeräten".

Primary Examiner—R. A. Rosenberger
Attorney, Agent, or Firm—Hume, Clement, Brinks, Willian & Olds, Ltd.

[57] ABSTRACT

An improved digital photoelectric position measuring device of the type comprising a scale, a scanning unit for generating scanning signals, and an evaluating circuit for evaluating the scanning signals, wherein the scanning unit includes at least one photoelectric circuit comprising a pair of photosensitive elements for generating counterphase scanning signals, and wherein the evaluating circuit includes at least one pulse forming circuit response to the difference of the counterphase scanning signals. The measuring device includes at least one photosensitive element for generating a direct flux signal and a light source for illuminating the photosensitive element. The direct flux signal is applied to at least one photoelectric circuit in order to balance the pair of photosensitive elements independently of the evaluating unit.

25 Claims, 5 Drawing Figures

PHOTOELECTRIC DIGITAL POSITION MEASURING SYSTEM

The present invention relates to improvements in photoelectric digital length and angle measuring systems of the type which include a scale, means for scanning the scale to generate scanning signals, and means, spatially separated from the scanning means, for evaluating the scanning signals, wherein the scanning means includes at least one photoelectric circuit comprising a pair of photosensitive elements for generating counterphase scanning signals, and wherein the evaluating means includes at least one pulse forming means responsive to the difference of the counterphase scanning signals.

In length or angle measuring systems of the type described above, it is a known practice to provide means such as a potentiometer for electrically balancing the periodic counterphase scanning signals to obtain the desired symmetry. In one type of prior art device this symmetry is preserved as the brightness of the means for illuminating the scale changes, because both scanning signals are separately amplified and summed in the evaluating means, giving proper consideration to their polarities. Balancing of this type however provides the disadvantage that, because the balancing is performed in the evaluating means, each change of the evaluating means requires a recalibration of the potentiometer to rebalance the counterphase scanning signals to obtain the desired symmetrical balance.

SUMMARY OF THE INVENTION

The present invention is directed to an improved length or angle measuring system of the above described type in which the evaluating means can be removed from the measuring device and replaced with another evaluating means without disturbing the symmetry or balance of the periodic counterphase scanning signals.

According to this invention, a digital photoelectric position measuring device of the type described above comprises photosensitive means for generating a direct flux signal, means for illuminating the photosensitive means, and means for applying at least a portion of the direct flux signal to at least one photoelectric circuit comprising a pair of photosensitive elements for generating counterphase scanning signals, such that the photosensitive means, the illuminating means, and the applying means cooperate to balance the pair of photosensitive elements.

One particularly important advantage of this invention is that in length or angle measuring devices built according to this invention, external evaluating means can be exchanged without the delay of recalibration, because the symmetrical balancing of the scanning signals is preserved independently of the particular evaluating means employed.

The invention, together with further objects and attendant advantages, will best be understood by reference to the following detailed description taken in connection with the accompanying drawings.

DETAILED DESCRIPTION OF THE PRESENTLY PREFERRED EMBODIMENTS

Figure 1:
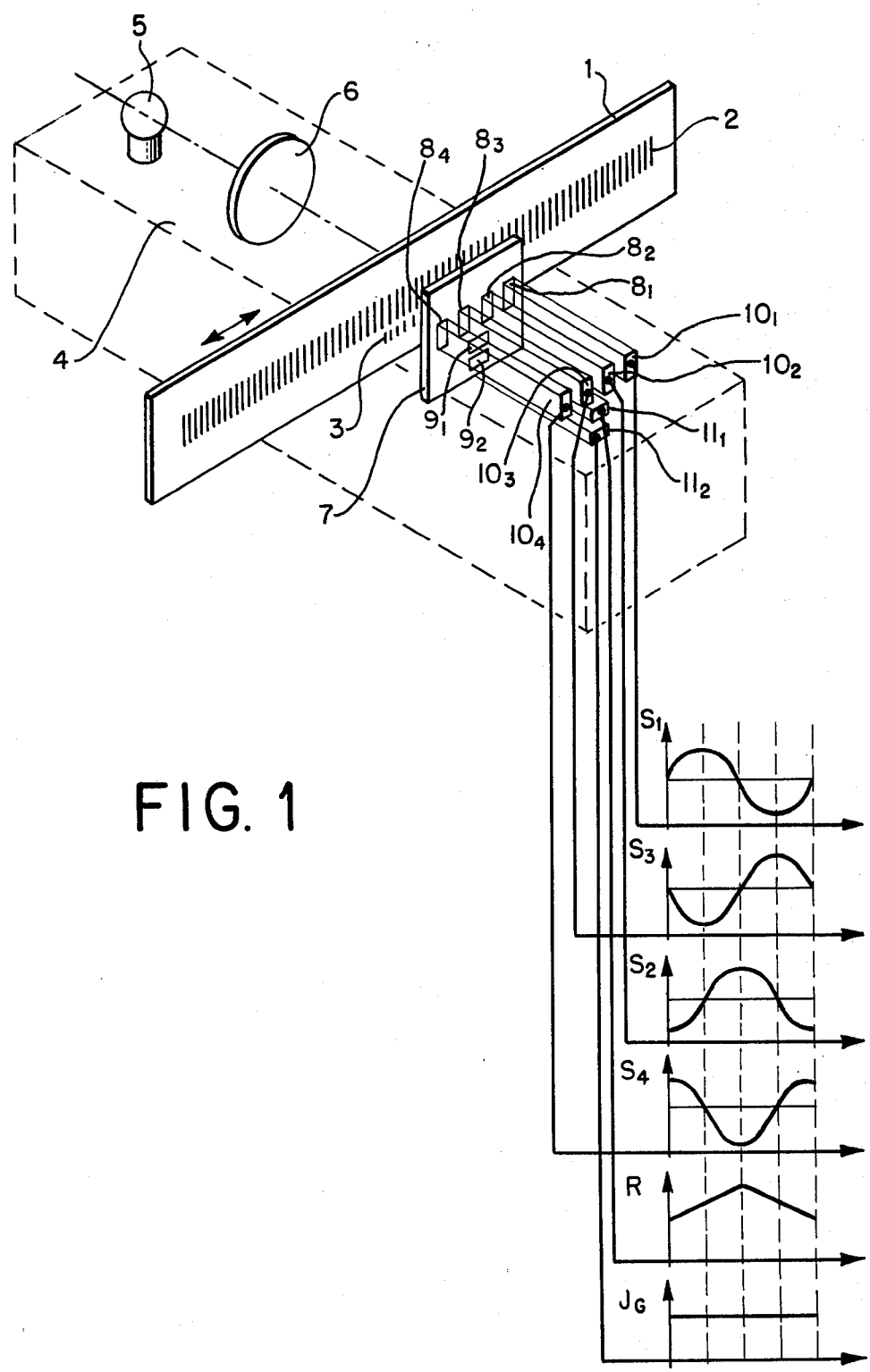
FIG. 1 is a schematic view of one type of digital photoelectric incremental length measuring suitable for use with the present invention.

Turning now to the drawings, FIG. 1 shows an incremental length measuring device which includes a longitudinally shiftable scale 1 and a scanning unit 4. In practice, the scale 1 is connected to means (not shown) for guiding the scale 1 in rectilinear motion in the plane of the scale 1. For example, the scale 1 could be mounted to the slide piece of a machine tool. The scale 1 incorporates an incremental division 2 as well as a reference division 3. In the example mentioned above the scanning unit 4 would be mounted to the bed of the machine tool. This scanning unit 4 includes an incandescent lamp 5, a condenser 6, and a scanning plate 7. The lamp 5 and the condenser 6 are positioned to illuminate the scale 1 and the scanning plate 7. The scanning plate 7 includes four scanning fields $8_1$ through $8_4$ for scanning the incremental division 2 as well as a scanning field $9_1$ for scanning the reference division 3 and a scanning field $9_2$. Preferably, the scanning field $9_2$ does not overlap any opaque markings on the scale 1. The scanning unit 4 also includes photosensitive elements $10_1$ through $10_4$, each of which is aligned with a respective one of the scanning fields $8_1$ through $8_4$, as well as additional photosensitive elements $11_1, 11_2$, each of which is aligned with a respective one of the scanning fields $9_1, 9_2$.

Each of the scanning fields $8_1$ through $8_4$ and the scanning field $9_1$ includes divisions (not represented) which correspond to the incremental division 2 and the reference division 3 of the scale 1, respectively. In addition, the divisions of the scanning fields $8_1$ through $8_4$ are offset with respect to one another in each case by a quarter of the spacing of the incremental division 2, that is by a phase angle of 90°. Thus, as the scale 1 moves relative to the scanning unit 4, the associated photosensitive elements $10_1$ through $10_4$ generate corresponding scanning signals $S_1$ through $S_4$, respectively. Because of the alignment of the scanning fields $8_1$ through $8_4$, the periodic scanning signals $S_1$ through $S_4$ are offset with respect to one another by a phase angle of 90°. As the reference division 3 moves with respect to the scanning field $9_1$, the photosensitive element $11_1$ generates a reference signal R, while the photosensitive element $11_2$ delivers over the entire measuring interval a constant direct flux signal $J_G$. This direct flux signal $J_G$ serves to establish a trigger threshold for the reference signal R in order to make it possible to allocate the reference signal R exactly to a certain increment. FIG. 1 shows typical waveforms of the scanning signals $S_1$ through $S_4$, the reference signal R, and the direct flux signal $J_G$.

In order to eliminate the direct voltage constituent of the periodic scanning signals $S_1$ through $S_4$, the signals generated by the photosensitive elements $10_1$ and $10_3$ are processed with opposed polarity, as are the signals generated by the photosensitive elements $10_2$ and $10_4$. In this way the difference signals $S_1-S_3$ and $S_2-S_4$ are formed. The difference signal $S_2-S_4$ is phase shifted by a phase angle of 90° with respect to the difference signals $S_1-S_3$. The two difference signals can be used to provide a clear discrimination of the direction of movement of the scale 1 with respect to the scanning unit 4.

Figure 2:
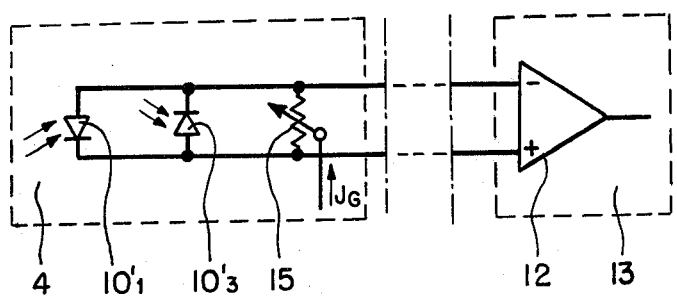
FIGS. 2-5 show four circuit diagrams of circuits for balancing counterphase signals according to this invention.

Because commercially available photosensitive elements generally differ one from another in terms of their photoelectric characteristics, the signals $S_1$ through $S_4$ must preferably be balanced for symmetry in order that proper difference signals can be formed. FIGS. 2-5 illustrate four circuits according to the present invention which can be used to perform this balancing operation. In FIG. 2 the two photosensitive elements $10_1,10_3$ are embodied as two photodiodes $10_1',10_3'$ which are circuited in anti-parallel orientation in the scanning unit 4. These photodiodes $10_1',10_3'$ are connected between the two inputs of a differential amplifier 12 included in an external evaluating circuit 13, which is spatially separated from the scanning unit 4. Light from the lamp 5 which passes through the condenser 6 and is modulated in the relative movement of the scale 1 with respect to the scanning fields $8_1,8_3$ of the scanning plate 7 acts upon the photodiodes $10_1',10_3'$ in a push-pull manner such that these photodiodes $10_1',10_3'$ generate periodic scanning signals $S_1',S_3'$ which are in counterphase relationship, that is separated by a phase angle of 180°.

In the circuit of FIG. 2 these two scanning signals are balanced for symmetry prior to the formation of the difference signal by means of a novel arrangement which includes a potentiometer 15. In this arrangement a portion of the direct flux signal $J_G$ generated by the photosensitive direct flux element $11_2$ is applied to the middle tap of the potentiometer 15. This potentiometer 15 is connected in parallel with the two anti-parallel photodiodes $10_1',10_3'$ in the scanning unit 4. The potentiometer 15 is adjusted to achieve the desired balancing of the scanning signals generated by the two photodiodes $10_1',10_3'$. The difference signal $S_1'-S_3'$ formed from the symmetrized signals $S_1',S_3'$ is evaluated in the external evaluating circuit 13. This evaluating circuit 13 includes a display (not shown) for displaying evaluated path information.

In a like manner (not shown) the second pair of periodic counterphase scanning signals $S_2,S_4$ generated by the second pair of photosensitive elements $10_2,10_4$ are also balanced for symmetry, and the balanced scanning signals are connected in anti-parallel to the two inputs of an additional differential amplifier (not shown) included in the evaluating circuit 13.

Figure 3:
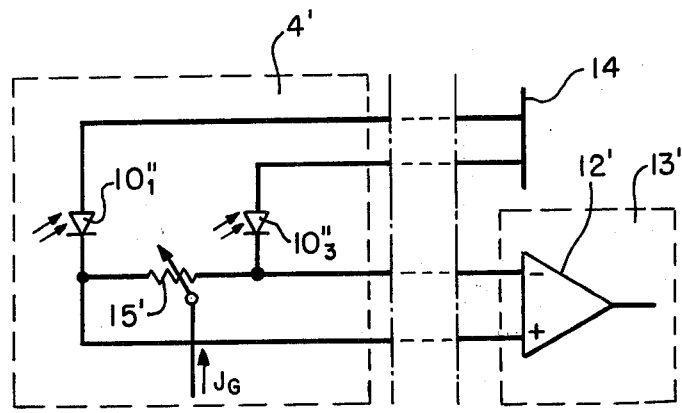
Figure 4:
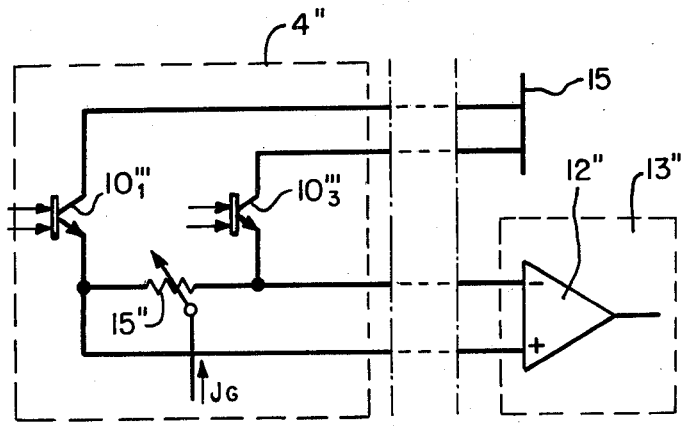

FIGS. 3 and 4 illustrate alternate embodiments of the circuit of this invention in which the two photosensitive elements $10_1,10_3$ take the form of photodiodes $10_1'',10_3''$ and of phototransistors $10_1''',10_3'''$ in the scanning units 4',4'', respectively, and are connected in anti-parallel with the two inputs of a differential amplifier 12',12'', respectively, of an external evaluating circuit 13',13'', respectively, which is spatially separated from the scanning unit 4',4'', respectively. In order to symmetrically balance the counterphase scanning signals generated by the photodiodes $10_1'',10_3''$ and the phototransistors $10_1''',10_3'''$, part of the direct flux signal $J_G$ generated by the photosensitive direct flux element $11_2$ is applied to the middle tap of a potentiometer 15',15'', respectively, connected in parallel across the terminals of the respective differential amplifier 12',12'' in the respective scanning unit 4',4''. The anodes of the photodiodes $10_1'',10_3''$ are connected with a preselected voltage by means of an external conductor 14, and the collectors of the phototransistors $10_1''',10_3'''$ are connected with a preselected voltage by means of an external conductor 15.

Figure 5:
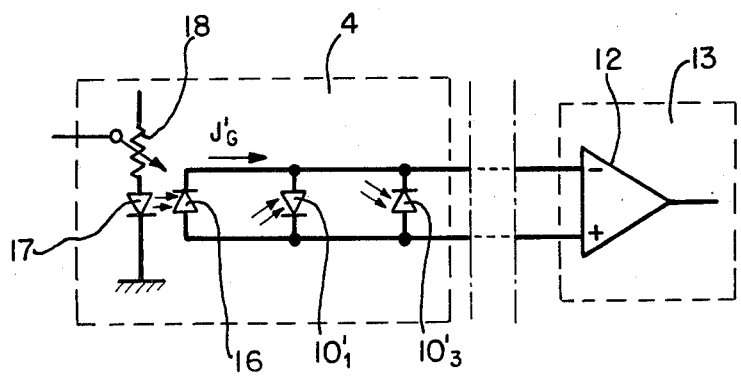

FIG. 5 shows a modification of the embodiment of FIG. 2. As in FIG. 2 two photodiodes $10_1',10_3'$ are circuited in anti-parallel fashion in the scanning unit 4. In the embodiment of FIG. 5 an additional photosensitive element 16 is connected in parallel with the photodiode $10_3'$. This additional photosensitive element 16 is used to generate a direct flux signal $J_G'$ which is applied to the circuit of the photodiodes $10_1',10_3'$. As shown in FIG. 5 the additional photosensitive element 16 is illuminated by a light emitting diode 17. The current flow through the light emitting diode 17, which is proportional to the brightness of this diode 17, is controllable by means of a potentiometer 18. It should be understood that in alternate embodiments the photoelectric element 16 can be illuminated by means of the incandescent lamp 5 and condenser 6, in which case the diodes 17 and potentiometer 18 can be eliminated.

In addition, it should be understood that the direct flux signal $J_G'$ generated by the additional photosensitive element 16 can be applied by means of a potentiometer into the circuit of the photosensitive element $10_1,10_3$, or $10_2,10_4$. The additional photosensitive element 16 for the generation of the direct flux signal $J_G'$ is required in an absolute or incremental length or angle measuring system of the type which does not include a photosensitive reference element $11_1$ or a corresponding photosensitive direct flux element $11_2$.

In a similar manner as the additional photosensitive element 16, the photosensitive direct flux element $11_2$, which can also be acted upon by a separate illumination element if desired, can also be connected in parallel to the circuit of the photosensitive elements $10_1,10_3$ and $10_2,10_4$. However, in order to reverse the polarity of the direct flux signals $J_G,J_G'$, the connections of the photosensitive elements $11_2,16$ to the circuits of the photosensitive elements $10_1,10_3$ and $10_2,10_4$ should be reversable in polarity.

Of course, it should be understood that various changes and modifications to the preferred embodiments described above will be apparent to those skilled in the art. The foregoing description has been provided to enable one skilled in the art to make and use the presently preferred embodiments of this invention. It is intended that the foregoing description to be taken as an illustration rather than a limitation of the present invention, which is defined by the following claims, including all equivalents.

I claim:

1. In combination with a digital photoelectric position measuring device comprising a scale; means for scanning the scale to generate scanning signals; and means, spatially separated from the scanning means, for evaluating the scanning signals; wherein the scanning means includes a scale illuminating means for illuminating the scale and at least one photoelectric circuit comprising at least one pair of scanning signal photosensitive elements for generating counterphase scanning signals; and wherein the evaluating means includes at least one pulse forming means responsive to the counterphase scanning signals; the improvement comprising:
    direct flux signal photosensitive means for generating a direct flux signal, the direct flux signal photosensitive means being illuminated by the scale illuminating means; and
    means for applying at least a portion of the direct flux signal to the at least one photoelectric circuit;
    said direct flux signal photosensitive means, scale illuminating means and applying means cooperating to balance the at least one pair of scanning signal photosensitive elements.

2. The invention of claim 1 wherein the measuring device further comprises reference signal generating means for scanning a reference division to generate a reference signal, the reference division being illuminated by the scale illuminating means, wherein the invention further comprises:

means for applying a portion of the direct flux signal to the reference signal generating means in order to establish a trigger threshold for the reference signal.

3. The invention of claim 1 wherein the measuring device further comprises means for scanning a reference division, the reference division being illuminated by the scale illuminating means, wherein the invention further comprises:

means for applying a portion of the direct flux signal to the means for scanning the reference division.

4. The invention of claim 1 or 2 or 3 wherein the means for applying at least a portion of the direct flux signal to the at least one photoelectric circuit comprises a potentiometer.

5. The invention of claim 4 wherein the potentiometer comprises two end taps connected in parallel with the at least one pair of photosensitive elements in the at least one photoelectric circuit and a middle tap connected to the at least a portion of the direct flux signal.

6. The invention of claim 1 or 2 or 3 wherein the direct flux signal photosensitive means for generating the direct flux signal comprises a direct flux photosensitive element connected in parallel with the at least one pair of scanning signal photosensitive elements in the at least one photoelectric circuit.

7. The invention of claim 1 or 2 or 3 wherein at least one of the scanning signal photosensitive elements of the at least one pair of scanning signal photosensitive elements comprises a photodiode.

8. The invention of claim 1 or 2 or 3 wherein at least one of the scanning signal photosensitive elements of the at least one pair of scanning signal photosensitive elements comprises a phototransistor.

9. The invention of claim 1 wherein the measuring device further comprises means for scanning a reference division, the reference division being illuminated by the scale illuminating means, wherein the invention further comprises:

reference threshold signal photosensitive means for generating a reference threshold signal, the reference threshold signal photosensitive means being illuminated by the scale illuminating means; and means for applying the reference threshold signal to the means for scanning the reference division.

10. In combination with a digital photoelectric position measuring device comprising a scale; means for scanning the scale to generate scanning signals; and means, spatially separated from the scanning means, for evaluating the scanning signals; wherein the scanning means includes a scale illuminating means for illuminating the scale and at least one photoelectric circuit comprising at least one pair of scanning signal photosensitive elements for generating counterphase scanning signals; and wherein the evaluating means includes at least one pulse forming means responsive to the counterphase scanning signals; the improvement comprising:

direct flux signal photosensitive means for generating a direct flux signal;

direct flux illuminating means for illuminating the direct flux signal photosensitive means; and means for applying at least a portion of the direct flux signal to the at least one photoelectric circuit;

said direct flux signal photosensitive means, direct flux illuminating means and applying means cooperating to balance the at least one pair of scanning signal photosensitive elements.

11. The invention of claim 10 wherein the measuring device further comprises reference signal generating means for scanning a reference division to generate a reference signal, the reference division being illuminated by the direct flux illuminating means, wherein the invention further comprises:

means for applying a portion of the direct flux signal to the reference signal generating means in order to establish a trigger threshold for the reference signal.

12. The invention of claim 10 wherein the measuring device further comprises means for scanning a reference division, the reference division being illuminated by the direct flux illuminating means, wherein the invention further comprises:

means for applying a portion of the direct flux signal to the means for scanning the reference division.

13. The invention of claim 10 or 11 or 12 wherein the invention further comprises:

means for adjusting the brightness of the direct flux illuminating means.

14. The invention of claim 13 wherein the direct flux illuminating means comprises a light emitting diode and the adjusting means comprises a potentiometer.

15. The invention of claim 10 or 11 or 12 wherein the means for applying at least a portion of the direct flux signal to the at least one photoelectric circuit comprises a potentiometer.

16. The invention of claim 15 wherein the potentiometer comprises two end taps connected in parallel with the at least one pair of photosensitive elements in the at least one photoelectric circuit and a middle tap connected to the at least a portion of the direct flux signal.

17. The invention of claim 10 or 11 or 12 wherein the direct flux signal photosensitive means for generating the direct flux signal comprises a direct flux photosensitive element connected in parallel with the at least one pair of scanning signal photosensitive elements in the at least one photoelectric circuit.

18. The invention of claim 10 or 11 or 12 wherein at least one of the scanning signal photosensitive elements of the at least one pair of scanning signal photosensitive elements comprises a photodiode.

19. The invention of claim 10 or 11 or 12 wherein at least one of the scanning signal photosensitive elements of the at least one pair of scanning signal photosensitive elements comprises a phototransistor.

20. The invention of claim 10 wherein the measuring device further comprises means for scanning a reference division, the reference division being illuminated by the direct flux illuminating means, wherein the invention further comprises:

reference threshold signal photosensitive means for generating a reference threshold signal, the reference threshold signal photosensitive means being illuminated by the direct flux illuminating means; and means for applying the reference threshold signal to the means for scanning the reference division.

21. In combination with a digital photoelectric position measuring device comprising a scale; a scanning unit for scanning the scale to generate scanning signals; and means, spatially separated from the scanning unit, for evaluating the scanning signals; wherein the scanning unit includes a scanning plate and a light source, the scanning plate comprising a first pair of scale scanning fields and a second pair of scale scanning fields, the light source positioned to illuminate the scale and the pairs of scale scanning fields; and wherein the scanning unit further comprises a first photoelectric circuit including a first pair of scanning signal photosensitive elements and a second photoelectric circuit including a second pair of scanning signal photosensitive elements, each pair of scanning signal photosensitive elements generating counterphase scanning signals in response to light from the light source which is modulated by the relative movement of the scale with respect to a respective pair of the two pairs of scale scanning fields; and wherein the evaluating means includes at least one pulse forming means responsive to the counterphase scanning signals; the improvement comprising:

a direct flux scanning field defined by the scanning plate;

a direct flux photosensitive element generating a direct flux signal in response to light from the light source which passes through the direct flux scanning field;

first means for applying at least a portion of the direct flux signal to the first photoelectric circuit; and second means for applying at least a portion of the direct flux signal to the second photoelectric circuit;

the direct flux photosensitive element, the light source and the first applying means and the second applying means cooperating to balance the first pair of scanning signal photosensitive elements and the second pair of scanning signal photosensitive elements respectively.

22. The invention of claim 21 wherein the first photoelectric circuit comprises a pair of photodiodes circuited in antiparallel orientation and wherein the second photoelectric circuit comprises a pair of photodiodes circuited in antiparallel orientation.

23. The invention of claim 21 or 22 wherein the first means for applying at least a portion of the direct flux signal to the first pair of scanning signal photosensitive elements comprises a first potentiometer and wherein the second means for applying at least a portion of the direct flux signal to the second pair of scanning signal photosensitive elements comprises a second potentiometer.

24. The invention of claim 23 wherein the first potentiometer comprises two end taps connected in parallel with the first pair of scanning signal photosensitive elements and a middle tap connected to the at least a portion of the direct flux signal and wherein the second potentiometer comprises two end taps connected in parallel with the second pair of scanning signal photosensitive elements and a middle tap connected to the at least a portion of the direct flux signal.

25. The invention of claim 21 wherein the direct flux photosensitive element is connected in parallel with the first pair of scanning signal photosensitive elements in the first photoelectric circuit and is connected in parallel with the second pair of scanning signal photosensitive elements in the second photoelectric circuit.

* * * * *